United States Patent
Leuthen

[11] Patent Number: 6,043,995
[45] Date of Patent: *Mar. 28, 2000

[54] METHOD AND APPARATUS FOR PULSE WIDTH MODULATION OF A POWER SUPPLY FOR INCREASED TRANSIENT STABILITY IN SUBSURFACE WELLBORE PUMPS

[75] Inventor: John Michael Leuthen, Claremore, Okla.

[73] Assignee: Centrilift, Claremore, Okla.

[ * ] Notice: This patent issued on a continued prosecution application filed under 37 CFR 1.53(d), and is subject to the twenty year patent term provisions of 35 U.S.C. 154(a)(2).

[21] Appl. No.: 09/149,916

[22] Filed: Sep. 9, 1998

[51] Int. Cl.⁷ .................................................. H02M 5/45
[52] U.S. Cl. .............................................. 363/37; 363/41
[58] Field of Search .................................... 363/37, 39, 41; 361/18, 111

[56] References Cited

U.S. PATENT DOCUMENTS

| | | | |
|---|---|---|---|
| 4,377,779 | 3/1983 | Plunkett | 363/41 |
| 4,626,763 | 12/1986 | Edwards | 363/41 |
| 4,935,859 | 6/1990 | Kirchberg et al. | 363/39 |
| 4,935,860 | 6/1990 | Kirchberg et al. | 363/39 |
| 4,961,130 | 10/1990 | Kirchberg, Jr. | 363/41 |
| 5,327,335 | 7/1994 | Maddali et al. | 363/39 |
| 5,420,778 | 5/1995 | Yoshino | 363/41 |
| 5,450,306 | 9/1995 | Garces et al. | 363/41 |
| 5,757,633 | 5/1998 | Bowles | 363/71 |
| 5,844,397 | 12/1998 | Konecny et al. | 318/811 |

*Primary Examiner*—Shawn Riley
*Attorney, Agent, or Firm*—Felsman, Bradley, Vaden Gunter & Dillon, LLP

[57] ABSTRACT

A variable speed controller is provided which utilizes a combination of pulse width modulation and fixed pulse control, such as a conventional six-step control, in order to generate multiphase sinusoidal power signals for use by downhole wellbore equipment, such as electrical submersible pumps. A controller is utilized to monitor at least one DC voltage level of the rectifier and/or inverter circuit of a variable speed controller. The DC level is compared to an optimum DC level. A triggering threshold is established. Once the triggering threshold is surpassed, the controller is utilized to switch between a conventional six-step mode of control and a pulse width modulation mode of control in order to better respond to a positive transient voltage condition. The pulse width modulation mode of operation provides for real time counteracting of the positive transient condition. Once the controller determines that the transient condition has subsided, control is returned to the conventional six-step control mode of operation.

18 Claims, 7 Drawing Sheets

METHOD AND APPARATUS FOR PULSE WIDTH MODULATION OF A POWER SUPPLY FOR INCREASED TRANSIENT STABILITY IN SUBSURFACE WELLBORE PUMPS

BACKGROUND OF THE INVENTION

1. Field of the Invention

The present invention is directed generally to systems for increasing the transient stability of power supplied to subsurface pumps, and particularly to the use of pulse width modulation to increase transient stability.

2. Description of the Prior Art

The present invention is a control system for a variable speed controller which may be utilized in conjunction with subsurface pumps, such as electrical submersible pumps, in order to supply power to the subsurface pump, but to do so in a way that allows for protection of the subsurface pump from positive transient power surges which represent a potentially detrimental operating condition for the electrical submersible pump, cables, and associated equipment. The relevant prior art will now be discussed.

In the prior art, two basic variable speed controller control systems are utilized to provide power to a subsurface pump which can be controlled by the operator in both its frequency and amplitude. As is conventional, sinusoidal power is supplied as an input to a controller. The controller rectifies the sinusoidal input to provide a DC power supply. Switching circuits are utilized to switch positive and negative DC voltage in a manner which in the aggregate simulates a sinusoidal output with a particular amplitude and frequency.

The frequency and amplitude of the simulated AC output may be controlled utilizing numerous algorithms. The most common algorithms are a six-step process or a pulse width modulation process. In six-step control, a sinusoidal waveform of a particular frequency and amplitude is constructed from a combination of six segments (three for each half cycle) with each segment having a particular fixed and uniform duration to establish the waveform's overall frequency, and the amplitude being controlled by varying the DC bus voltage by means of a controlled converter (or rectifier). In contrast, in pulse width modulation, the converter is controlled so that the DC bus voltage is constant and the sinusoidal waveform is constructed from combinations of positive pulses and negative pulses, whose width vary in proportion to the instantaneous value of the ideal waveform at each instant to control the amplitude.

Conventional pulse width modulation is disfavored in the industry since a continuous pulse width modulation represents a greater number of opportunities for the generation of high peak voltages, due to the greater number of pulses typically utilized to generate a sinusoidal waveform. High peak voltages, such as positive transients, are especially harmful to subsurface electrical systems such as electrical submersible pumps and should be avoided. High peak voltages present a threat to cable and insulation within the subsurface pump. Additionally, high, uncontrolled peak voltages represent a risk of setting up resonance within the subsurface electrical system, since the subsurface components represent various capacitive, inductive, and resistive values which could be pushed into resonance. If a transient of unknown amplitude and frequency acts upon the system, there is some chance that resonance will be established which can be detrimental to the wellbore pump.

Increasing the amount of control that one has over subsurface equipment is one broad industry goal. Additionally, to increase such control without introducing any additional risks of malfunction is also an important industry goal.

SUMMARY OF THE INVENTION

It is one objective of the present invention to provide a method and apparatus for controlling a subsurface pump, such as electrical submersible pump, by using a novel combination of a fixed pulse control, such as a conventional six-step control, and pulse width modulation control.

It is another objective of the present invention to allow for the intermittent utilization of pulse width modulation in response to the detection of a positive transient condition, but to do so only for so long as is necessary to counteract the potentially detrimental effect of the positive transient condition; at all other times, the controller operates in a conventional fixed pulse control mode of operation.

Additional objects, features and advantages will be apparent in the written description which follows.

DETAILED DESCRIPTION OF THE INVENTION

Figure 1:
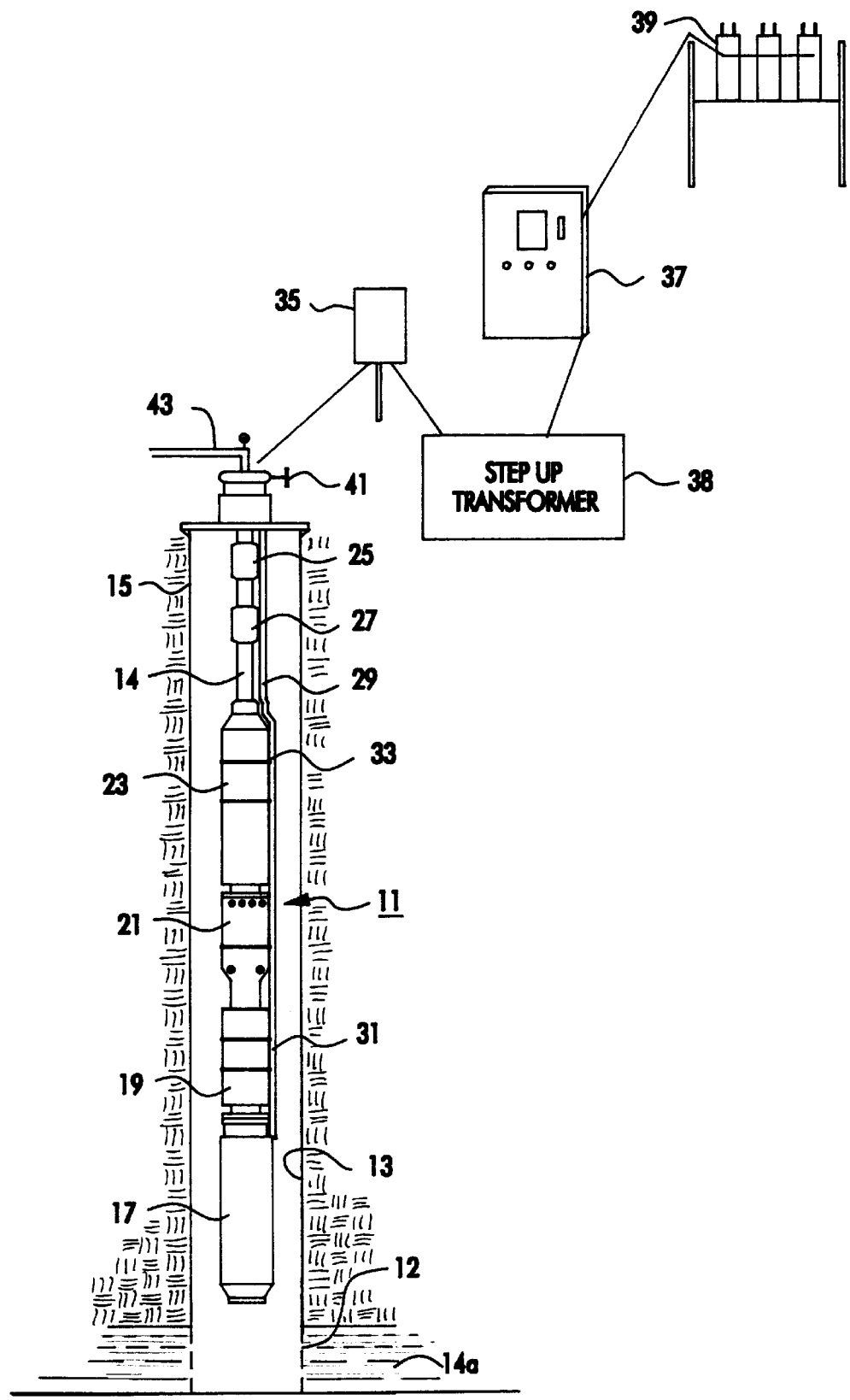
FIG. 1 is a simplified and pictorial representation of an electrical submersible pump (ESP) and associated equipment, including control equipment in accordance with the preferred embodiment of the present invention.

FIG. 1 is a simplified pictorial representation of an electrical submersible pump. As is shown, electrical submersible pump 11 is disposed within wellbore 13 which is cased by casing. The electrical submersible pump 11 is carried by tubing string 14. Typically, electrical submersible pump 11 is utilized to lift wellbore fluids 14 which enter wellbore 13 through perforations 12. The wellbore fluid 14 is directed upward through tubing string 14, and through wellhead 41 to a production flowline 43 for storage in storage tanks (which are not depicted).

Electrical submersible pump 11 includes electrical motor 17 which drives the lifting operations. Electrical motor 17 is energized by power cable 29 and flat cable 31 which extend downward from the earth's surface, and which are secured into position on the outside of tubing string 14 and electrical submersible pump 11 by cable bands 33. Electrical motor 17 includes a fluid-tight housing which houses the electrical motor devices. Seal section 19 serves to further isolate and seal the electric motor housing. Electric motor 17 may, for example, be utilized to power the operation of rotary gas separator 21 and centrifugal pump 23. As is conventional, a check valve 27 is provided to prevent the back flow of production fluid. Additionally, drain valve 25 is provided at an uppermost portion of tubing string 14 to allow drainage and to prevent backflow. Electrical power is provided to electric motor 17 from transmission lines (not shown) through step-down transformer 39, motor control 37, and vent box 35, and step-up transformer 38.

Figure 2:
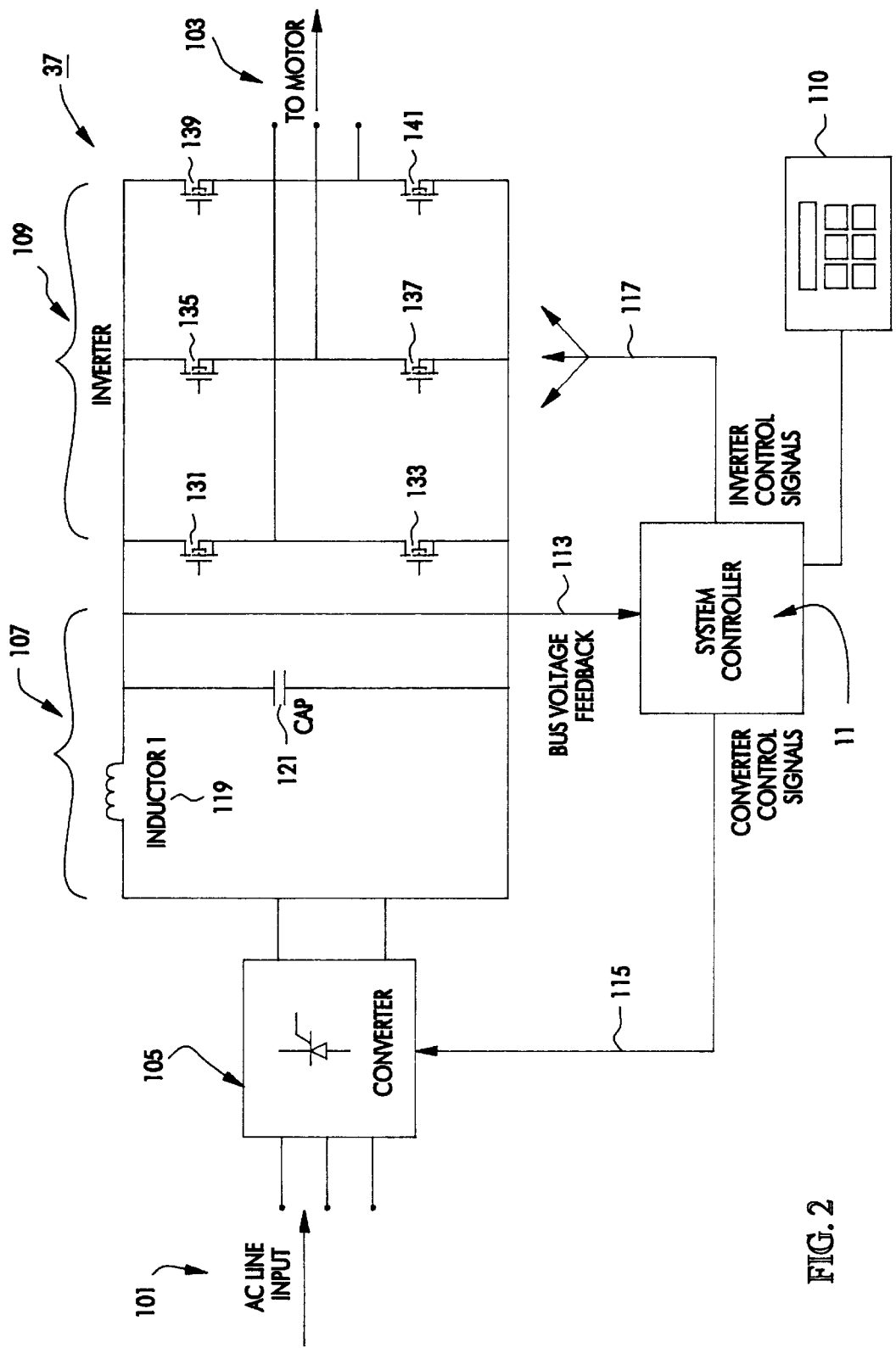
FIG. 2 is a schematic and block diagram depiction of a motor controller which may be utilized to supply power to a wellbore pump, such as the electrical submersible pump of FIG. 1.

FIG. 2 is a simplified electrical and block diagram schematic of controller 37 of FIG. 1. Controller 37 includes as an input 101 a 480 volt, three-phase alternating current. Controller 37 provides an output 103 which has a particular frequency and amplitude which are set by an operator to meet some operational objective. Controller 37 includes a rectifier circuit 105 which is a three-phase bridge rectifier which includes silicon controlled rectifiers. Rectifier 105 receives the AC input 101 and produces a DC level as an output. The output of rectifier 105 is provided as an input to low pass filter 107 which includes inductor 119 and capacitor 121. The output of low pass filter 107 is provided to inverter circuit 109. Inverter circuit 109 includes six IGBTs (insulated gate bipolar transistors) including IGBTs 131, 133, 135, 137, 139, and 141. A system controller 111 is provided which receives a bus voltage feedback 113 which provides feedback on the operation of the components. System controller 111 produces converter control signals 115 which are supplied to rectifier 105 and which provide control and timing signals for operation of the silicon controlled rectifiers contained within rectifier 105. Additionally, system controller 111 produces inverter control signals 117 which are supplied to the IGBTs 131, 133, 135, 137, 137, and 141 in order to control their operation which establishes the output 103 of controller 37. System controller 111 includes one or more microprocessors or industrial controllers which are preprogrammed with computer instructions for controlling the various components of controller 37. Additionally, an input device 110 may be provided to allow the operator to set various operating parameters for the wellbore pump. For example, input device 110 allows the operator to select the voltage and frequency of operation of output 103 of controller 37.

Figure 3:
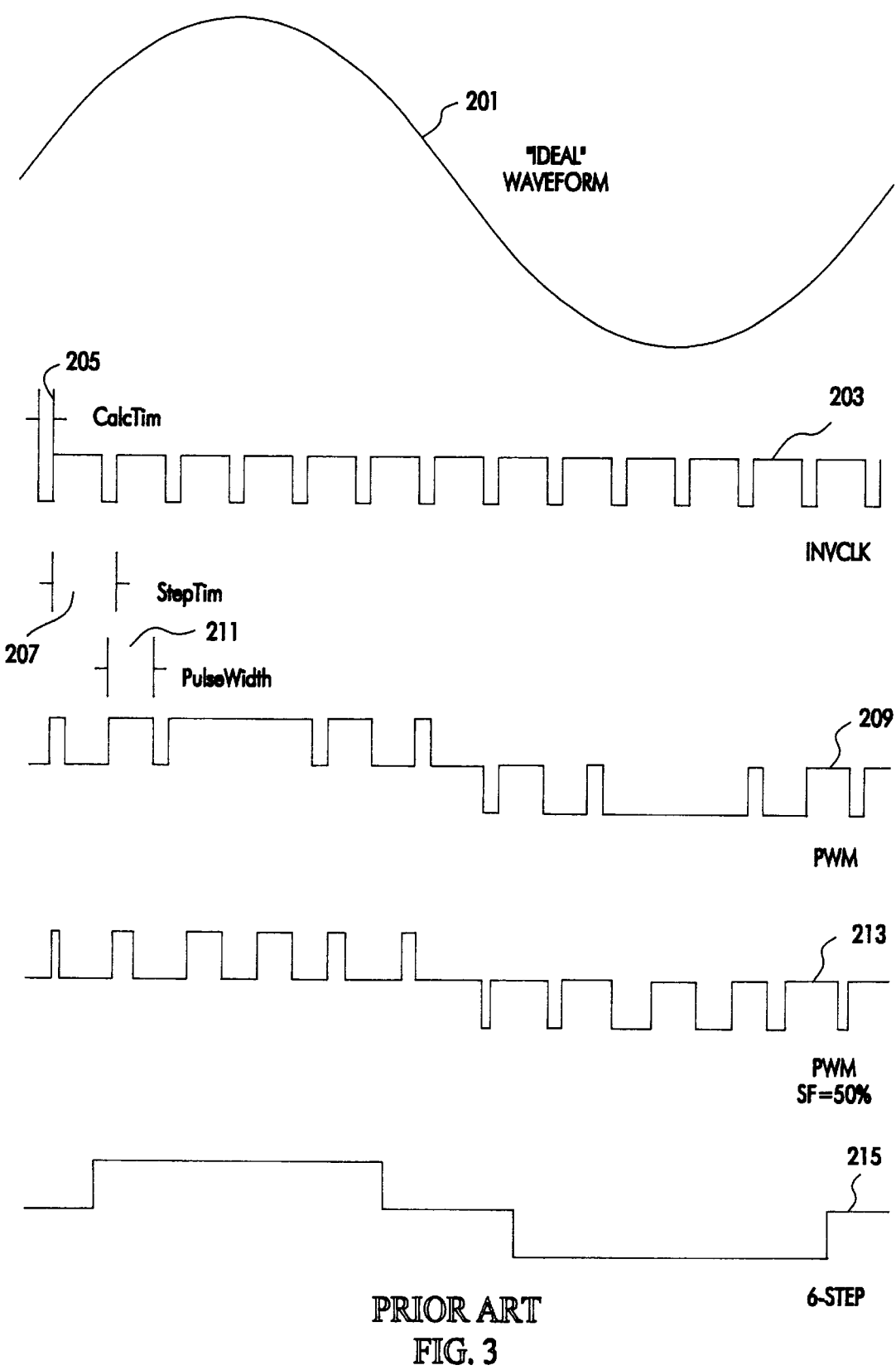
FIG. 3 is a depiction of prior art wave forms which illustrate the "ideal wave form", the clock signal utilized in a control circuit, pulse width modulation control, pulse width modulation with scaling to reduce the average voltage, and six-step control.

FIG. 3 is a pictorial representation of a plurality of wave forms which will be utilized to demonstrate the state of the prior art. The primary objective of prior art controllers is to allow operator control of the frequency and voltage of operation, notwithstanding the fact that the power supplied to the controller is of fixed frequency and amplitude. In the prior art, the goal is to produce a wave form which approximates the ideal wave form 201 of FIG. 3. An inverter clock signal (INVCLK) 203 is utilized for timing purposes, both in the prior art and in the present invention. The clock signal used to divide each cycle of the waveform into multiple segments which each have a width labeled Steptim 207 and for timing of the calculations necessary to determine pulsewidth for each segment.

In FIG. 3, wave form 209 represents a pulse width modulated signal which is composed of the combination of positive and negative pulses. One method to generate a PWM signal is to divide "ideal" waveform into a number of equal time segments as shown in FIG. 3. Each segment has a time labeled as "StepTim" 207. For each segment of time there is a pulsewidth that corresponds to the desired amplitude of the "ideal" waveform during that segment. The ratio of this pulsewidth to the Steptim determines the effective instantaneous percentage output voltage during this segment. As the frequency of operation increases (or decreases), the Steptim will accordingly decrease (or increase), to maintain the same number of segments during the waveform while the pulsewidth as a percentage of StepTim will change to maintain the desired output voltage. To vary the average output voltage, the pulsewidth of each segment is multiplied times a Scale Factor value (SF) which is calculated from the desired operating voltage set by the operator and the bus voltage. As is shown in FIG. 3, wave form 209 is an approximation of a sinusoidal wave form. Wave form 213 represents an approximation of a sinusoidal wave form having the same frequency, but a different, lower amplitude than wave form 209. In particular, wave form 213 represents a pulse width modulated wave form which has a scaling factor of 50% of the amplitude of the pulse width modulated wave form 209. The difference in amplitude is obtained by diminishing the duration of each of the positive and negative pulse components by the same percentage which together provide a simulated sinusoidal wave form.

This can be contrasted with the six-step control which is depicted in wave form 215. As is shown, a plurality of much longer duration pulses (both positive and negative) are provided which also represent an approximation of a wave form, but which is much "cruder" than can be accomplished utilizing pulse width modulation.

In the present invention, a controller is utilized to select between the six-step control technique and a pulse width modulation technique in order to provide a real-time compensation for detected positive transients in order to mitigate their impact. During normal operating intervals, wherein no positive transient is detected, the six-step technique is utilized to generate approximations of the ideal sinusoidal wave form 201 on FIG. 3, and a typical output during this six-step control mode of operation is depicted in wave form 215 of FIG. 3. However, once a predetermined increase in the DC voltage is detected, the mode of control switches from the six-step mode of control to a pulse width modulation mode only for so long as is necessary to counteract the potential detrimental impact of the positive transient condition. Once the positive transient condition has abated, control is returned to the six-step mode of operation.

Figure 4:
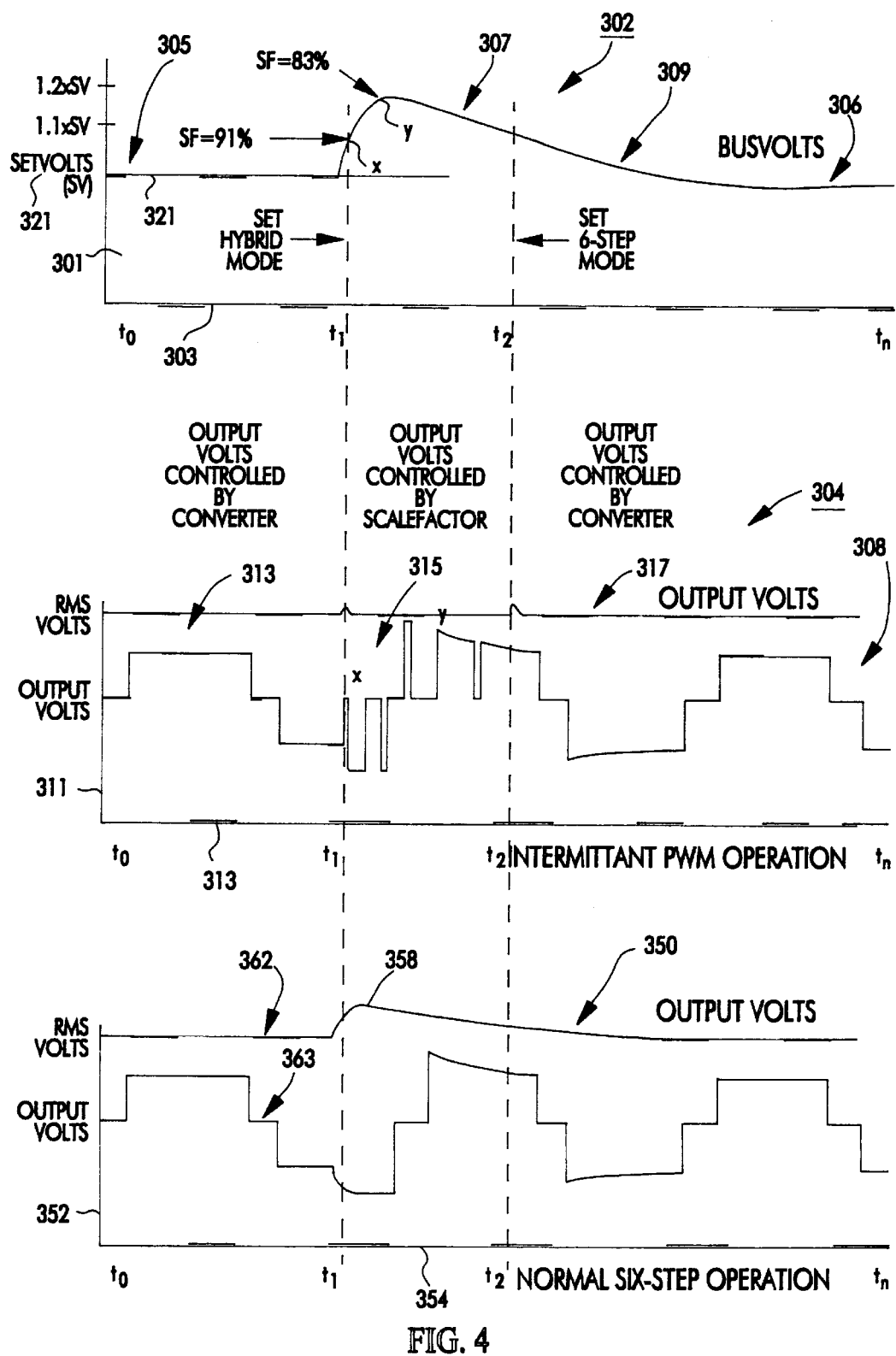
FIG. 4 is a graphical depiction of a transient condition and the response of the present invention to such transient condition in comparison to the control obtained utilizing prior art controllers.

FIG. 4 is a graphical representation of the utilization of the present invention to counteract potentially negative effects of a positive voltage transient. Two graphs are provided to illustrate the concepts of the present invention. In the upper graph 302, the y-axis 301 is representative of the amplitude of the rectified DC voltage, while the x-axis 303 is representative of time. In the middle graph 304, the y-axis 311 is representative of output (RMS) volts of the simulated sinusoidal wave form, and the x-axis 313 is representative of time. In both graphs, from the time $t_0$ to $t_1$ the controller is operating in a six-step mode of operation. During the time intervals $t_1$ through $t_2$, the controller is operating in a pulse width modulation mode of operation. During the time intervals $t_2$ through $t_n$ the controller returns to the six-step mode of operation.

With reference now to upper graph 302, the waveform 306 is a graphical representation of the "BUSVOLTS" which is an internal DC level which is established after, and which is directly dependent upon, the selected operating frequency for the subsurface pump. Recall that in the six-step mode of operation the frequency of the simulated sinusoidal waveform is determined by the duration of the pulse components. The SETVOLTS value is the desired operating value for BUSVOLTS calculated from the operating parameters input by the Operator. In six-step operation, BUSVOLTS is related to output volts by a fixed value, and output volts is controlled by controlling BUSVOLTS. By contrast, in normal PWM operation, BUSVOLTS would be held constant at its maximum controlled value and output volts would be controlled by Scale Factor (SF) which would vary between 0 and 1 (0%–100%). SF is a function of SETVOLTS and BUSVOLTS and determines output voltage. In the present invention, it is intended to define a mode of operation called "Intermittent PWM" in which the output voltage is momentarily controlled by PWM operation and the value of SF to maintain the output voltage at the same effective value as it would be using six-step operation and the desired SETVOLTS. During segment 305 of waveform 306, BUSVOLTS 321 is at a predetermined and optimum amplitude in order to determine the frequency and amplitude of the output sinusoidal waveform. During segment 305, the controller is operating in a six-step mode of operation. In accordance with the present invention, a threshold is established for detection of uncontrolled positive transient amplitude elevations in the BUSVOLTS 321 value. In the view of upper graph 302, this threshold is established at 1.1 times the value of the SETVOLTS 321. Any uncontrolled voltage elevation above this trigger level will initiate a computer-implemented moderation of the output volts value in accordance with the intermittent pulse width modulation mode of operation which is represented by segment 307.

As is graphically depicted in upper graph 302, at $t_1$ the value of BUSVOLTS increases to the triggering threshold of 1.1 times the SETVOLTS value. This, once detected, initiates the pulse width modulation mode of operation which counteracts the potentially detrimental effects of the positive transient condition as manifest in the value of BUSVOLTS. In the view of upper graph 302, points x and y are marked and a corresponding scale-down factor is annotated thereon. The Scale Factor (SF) is the value which is multiplied times each pulse of the "standard" PWM waveform (FIG. 3–209). By this means, the output voltage is controlled at the correct value even though BUSVOLTS is momentarily uncontrolled. At point x, SF is reduced from 100% to 91% which would make each pulse of PWM waveform 91% of its "standard" value. Likewise, at point y, SF is reduced even further to 83% because BUSVOLTS has increased to 1.2 times its nominal value. This correction of the Scale Factor and therefore the output volts is graphically depicted in the middle graph 304 which will be discussed later.

At $t_2$ the positive transient condition abates somewhat and the BUSVOLT value crosses the predetermined threshold of 1.1 times the optimum SETVOLT value. This triggers a switch in mode of operation from the pulse width modulation mode of operation back to the six-step mode of operation. Segment 309 represents the measured BUSVOLT value after $t_2$.

Middle graph 304 of FIG. 4 is graphical representation of the output volts of a simulated waveform which corresponds directly to the transient condition detected in the SETVOLT value which is depicted in upper graph 302. Waveform 308 is divided into three segments, including segment 313, segment 315, and segment 317. Segment 313 corresponds to the output volts of the controller during a six-step mode of operation, and is conventional in all respects. At $t_1$ through $t_2$ the controller is automatically switched from a six-step mode of operation to the pulse width modulation mode of operation to allow for corrective action to be taken in response to the detected positive transient condition. In segment 317 between $t_2$ through $t_n$ the controller is once again operated in a six-step mode of operation with the output being determined by the six-step mode of operation, as is conventional.

During segment 315 of middle graph 304, a greater number of pulses, with varying durations, are utilized to directly counteract the increase in BUSVOLTS value of upper graph 306. At $t_1$ the duration of the pulses is determined in a manner which exactly compensates the output voltage for the increase in BUSVOLTS by effectively decreasing the SETVOLTS by the SF of 91%. At time t=y the duration of the pulses are determined in a manner which counteracts for the increase in the BUSVOLT value in a manner which corresponds to a decrease in the effective SETVOLT value to an amount of 83% of the optimum SETVOLT value. In this manner, the pulse width is controlled to counteract the detected increase in the BUSVOLT value which is determined to correspond to an undesirable positive transient condition.

The lower graph 350 of FIG. 4 depicts a prior art response to a comparable transient condition and is provided to allow contrasting between the manner in which a prior art device would react to a similar uncontrolled positive transient condition (of upper graph 302) to the intermittent pulse width modulation mode of operation of middle graph 304. In lower graph 350, the x-axis is representative of time and the y-axis is representative of output volts. Two output volts curves are provided. The RMS output volts 362 and the output volts 363. There are three time segments of interest. The first segment is from time $t_0$ to time $t_1$. During this interval, the output volts curve 363 and RMS output volts curve 362 is unaffected by the positive transient condition. in time interval $t_1$ through $t_2$, the uncontrolled positive transient condition is occurring and its detrimental effect on the RMS output curve 362 is demonstrated as the undesired rise 358 in the RMS output volt curve 362. This stands in sharp contrast with the relatively diminimus rise in RMS output volt which can be obtained utilizing the present invention, as is depicted in middle graph 304 of FIG. 4. The contrast between middle graph 304 and lower graph 350 represents the advantage which can be obtained utilizing the present invention.

Figure 5A:
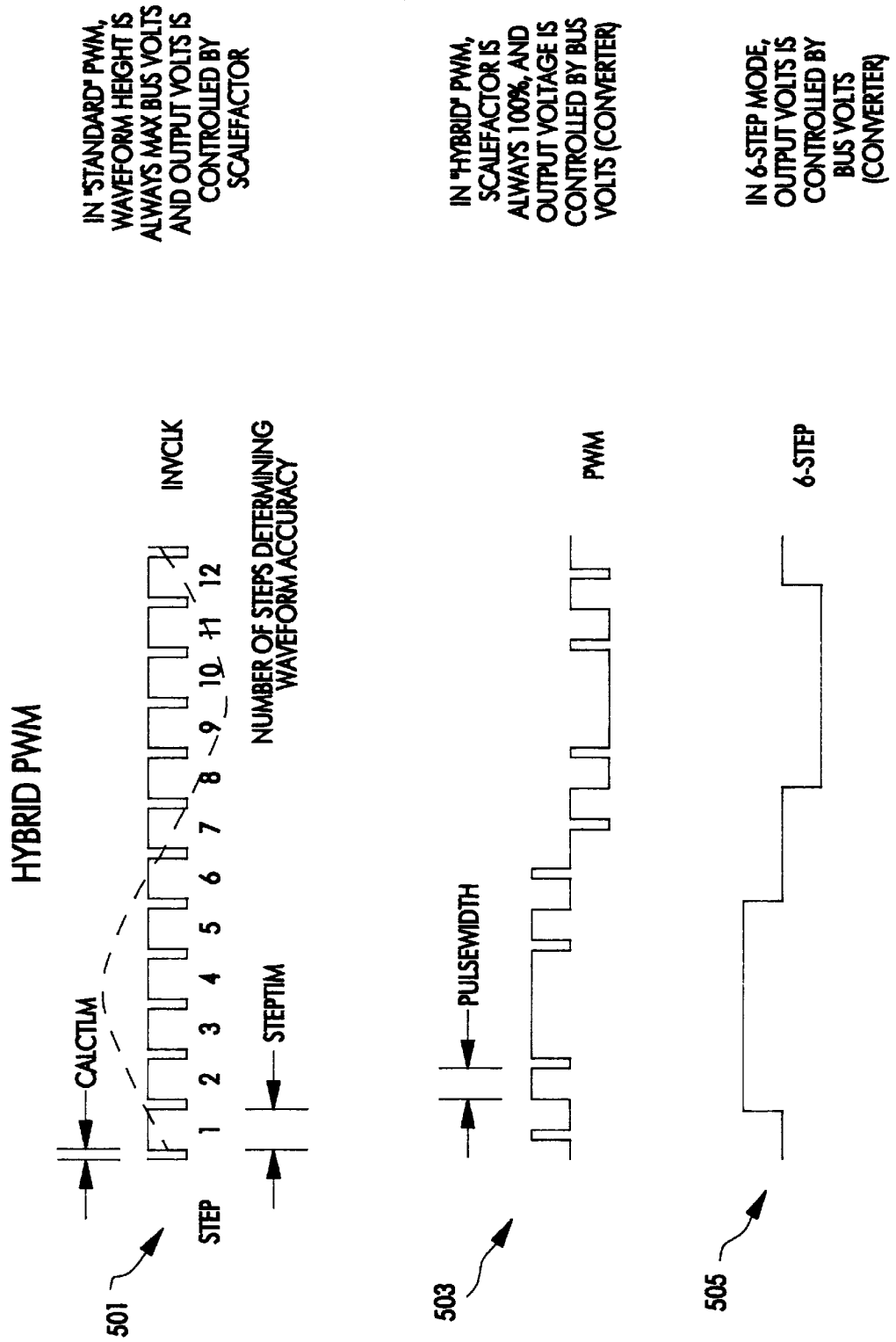
FIG. 5 is a flow chart and graphic representation of the control system of the present invention.
Figure 5B:
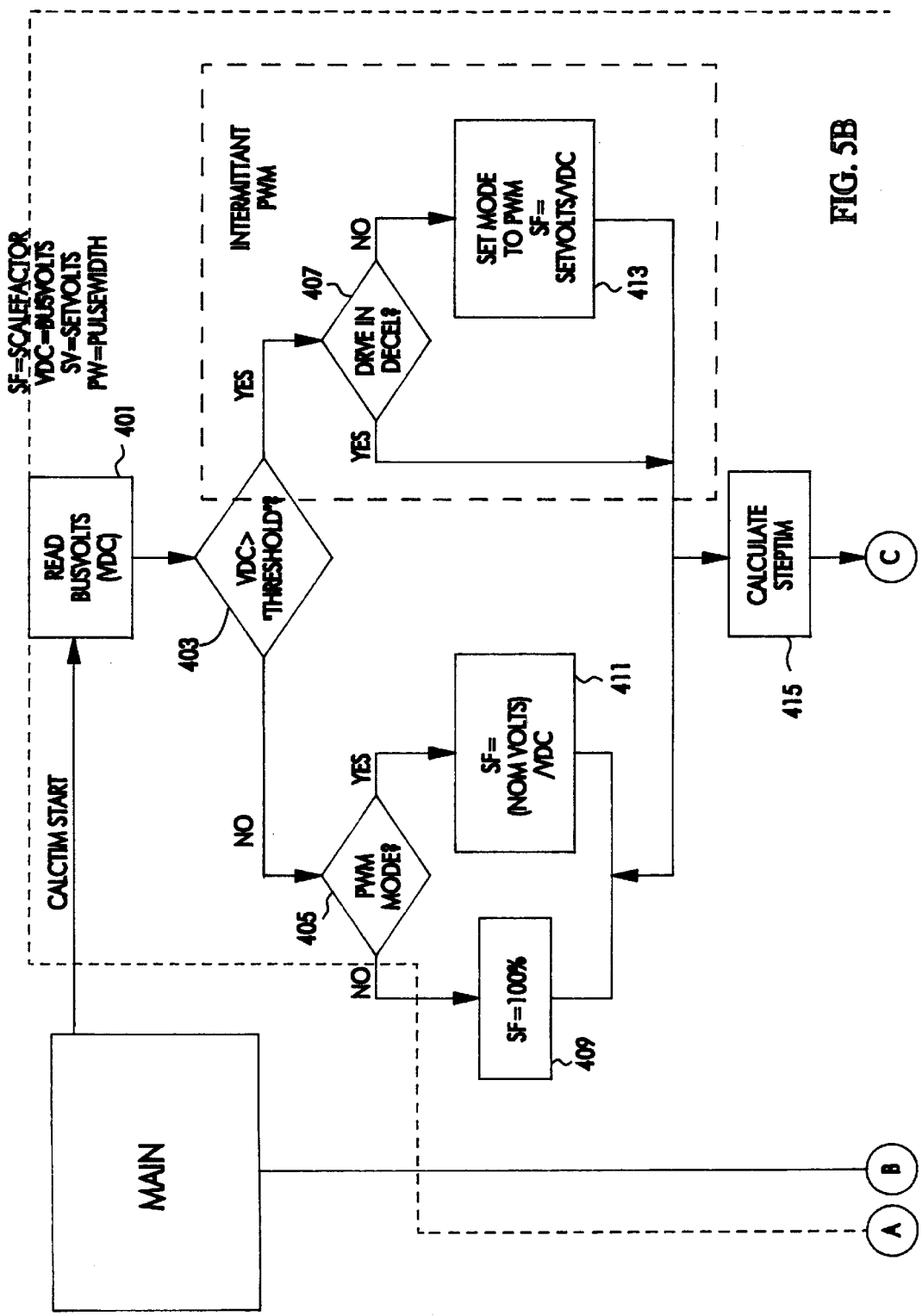
Figure 5C:
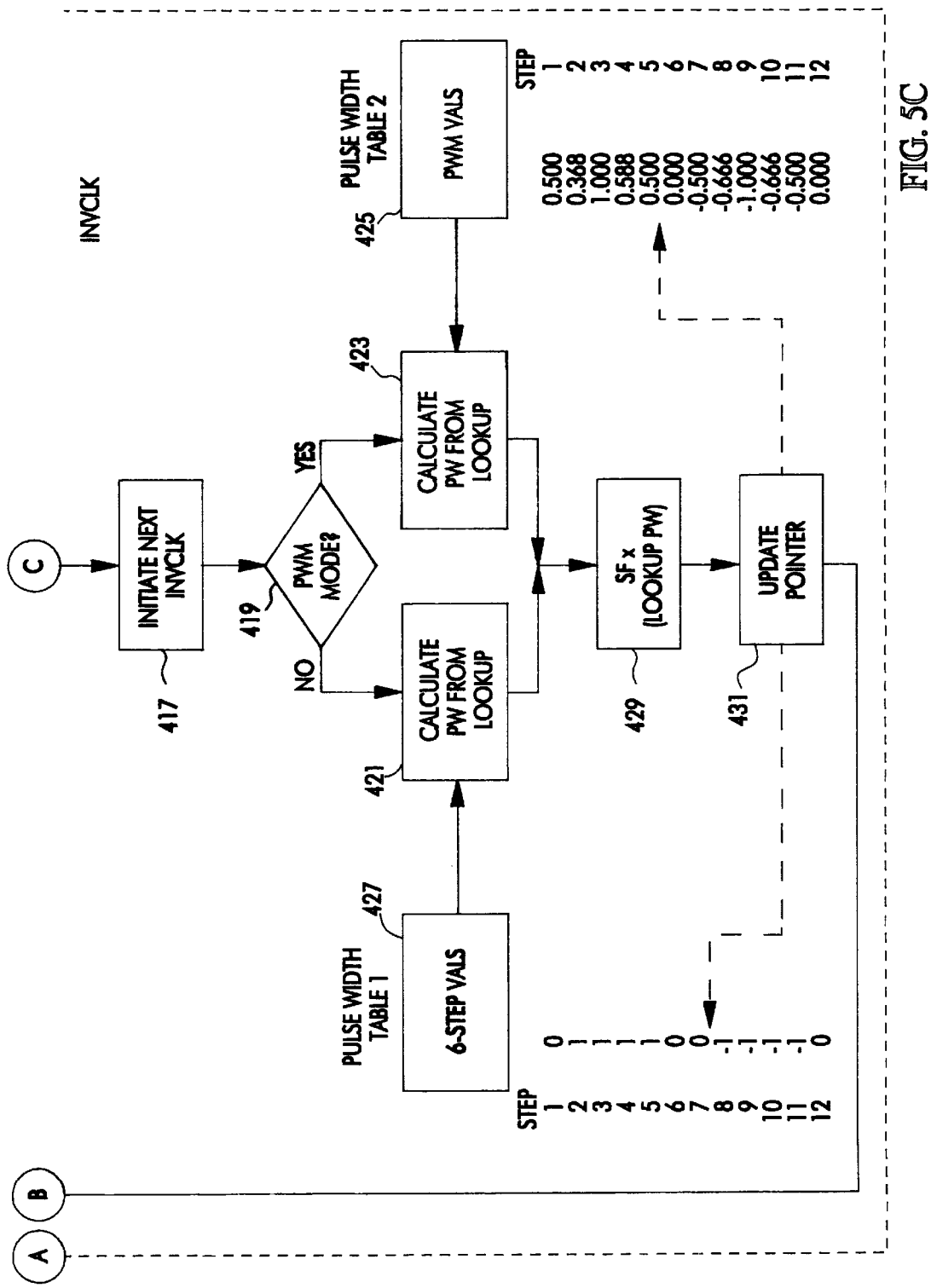

FIG. 5 is a flowchart representation of the preferred embodiment of the present invention of implementing the pulse width modulation mode of operation in combination with a more conventional six-step mode of operation. In accordance with the flowchart, the prior art (and conventional) software is represented by block 400. In accordance with the present invention, the intermittent pulse width modulation mode of operation may be a software module which is added to preexisting software in a variable speed controller which operates in conjunction with the other routine and conventional operations performed by the variable speed controller. Block 400 represents the conventional software and hardware utilized to implement the variable speed controllers in the prior art.

As is shown, the process starts at block 401 wherein the hardware/software is utilized to read the value of the bus volts, which represents the DC power supply available. Next, in accordance with block 403, the hardware/software is utilized to compare the value (VDC) of the bus volt as monitored to a predetermined threshold. If the amplitude of the bus is greater than the predetermined threshold, the processor continues to block 407. However, if it is determined at block 403 that the amplitude of the bus volts is not in excess of the predetermined threshold, the processor continues in accordance with block 405.

With reference now to block 407, once it is determined that the bus threshold value exceeds a predetermined threshold, processing continues in accordance with block 407 to determine whether the subsurface pump is in a "deceleration mode" of operation. This is important since a deceleration mode of operation is typically accompanied by changes in the DC bus level which do not represent undesirable transient conditions, and thus which are acceptable. If it is determined at block 407 that the subsurface pump is indeed in a "deceleration mode of operation," control passes directly to block 415; however, if it is determined at block 407 that the subsurface pump is not in a deceleration mode of operation, then the elevated level in the bus volt's value is assumed to be a potentially detrimental positive transient condition, and control passes to block 413. In accordance with block 413, the mode of operation is changed from a six-step mode of operation to a "pulse width modulation mode of operation" and a scale factor (SF) is calculated which is the ratio of the desired SETVOLT value to the monitored DC level of the bus. This inverse relationship means that, for every detected increase in the actual monitored DC level of the bus volts, there is a corresponding decrease in the Scale Factor. Next, control passes to block 415.

Returning now to block 403, if it is determined that the monitored DC level of the bus volts does not exceed the threshold level, control passes to block 405 wherein the controller examines the software state to determine whether the pulse width mode of operation has been enabled. If the pulse width mode of operation has not been enabled, control passes to block 409 wherein the Scaling Factor (SF) is set to 100%, because scaling down is not necessary. However, if it is determined at block 405 that the current operating condition of the controller is a pulse width mode of operation, control passes to block 411 wherein the Scaling Factor is set to the ratio of the nominal volts to the monitored VDC voltage level. After execution of the operations of block 409 or 411 control passes to block 415.

In accordance with block 415, the processor is utilized to calculate the "steptim" (which is graphically depicted in FIG. 3 as STEPTIM 207 of waveform 203). Next, in accordance with block 417, the next clock signal is initiated. Then, control passes to block 419.

In accordance with block 419, the processor again examines its current operating condition to determine whether or not it is in a "pulse width modulation" mode of operation. If the controller is in a this mode of operation, control passes to block 423; however, if the controller is not in this mode of operation control passes to block 421. In accordance with block 423, the pulse width of the next pulse is calculated utilizing lookup table 425 which has a number of pulse widths the "ideal" waveform amplitude during that segment of time. In block 421, the pulse width is calculated from lookup table 427 which is a lookup table containing the six-step values for six-step control.

Examples of the types of values contained within the pulse width value table 425 are provided directly below block 425. As is shown, there are 12 discreet steps (of course, any other number of steps may be utilized), with a numeric value associated with each step. Some of the values are positive and some are negative. This allows for the generation of an approximation of a sinusoidal waveform. Exemplary values for the six-step table of block 427 are also provide beneath block 427. As shown, there are 12 steps. For each step there is an associated numeric value which is either zero, positive one, or negative one. These values may be utilized to generate an approximation of a sinusoidal waveform.

At the top of FIG. 5, there are three waveforms provided. Waveform 501 represents one cycle of a sinusoidal waveform with the clock signal superimposed thereon, to allow for identification of the twelve segments which make up one single cycle of a particular sinusoidal waveform. Waveform 503 is a representation of a simulated sinusoidal waveform constructed utilizing pulse width modulation. Waveform 505, in contrast, is a representation of the simulation of a sinusoidal waveform in accordance with the six-step mode of operation.

Returning now to the flow chart representation, in accordance with block 429, the processor examines its memory buffer to determine the value for the Scaling Factor. The Scaling Factor is then applied to a particular pulse that is to be generated. Next, in accordance with block 431, a pointer is updated to allow the software to know what portion of the sinusoidal waveform has just been generated. This process is repeated over and over again for each portion of the sinusoidal waveform, allowing for real-time correction for elevations in the DC voltage which result from positive transient conditions.

It can be appreciated that the continuous execution of these instructions will result in a switching back and forth between a conventional six-step mode of operation and a pulse width modulation mode of operation. Additionally, the Scaling Factor may be moved between 100% and some value less than 100% in order to compensate for the particular amount of detected positive transient increase in the DC voltage supply.

What is claimed is:

1. An apparatus for supplying power to electrical power consuming subsurface wellbore equipment, comprising:
   (a) an input for receiving a multiphase sinusoidal power input having a frequency and amplitude;
   (b) a rectifier circuit for rectifying said multiphase sinusoidal power input circuit electrically coupled to said rectifier circuit;
   (c) an inverter circuit for producing a multiphase output having a selected frequency from a range of available frequencies;
   (d) a controller electrically coupled to said inverter circuit and said rectifier circuit for executing program instructions to moderate operations of said inverter circuit in order to develop said multiphase output having said selected frequency;
   (e) a control input electrically coupled to said controller for receiving commands including a value for said selected frequency from said range of available frequencies;
   (f) wherein said controller is operable in a plurality of modes of operation, including:
      (1) a fixed pulse mode of operation in which said controller executes program instructions for generating a multiphase sinusoidal output having said selected frequency by combining positive and negative pulses of fixed and uniform durations, in a predetermined manner;
      (2) a pulse width modulation mode of operation in which said controller executed program instructions for generating a multiphase sinusoidal output having said selected frequency by controlling said inverter circuit to generate positive and negative pulses of particular non-uniform durations and by combining said positive and negative pulses in a predetermined manner.

2. An apparatus according to claim 1, wherein said power input comprises a three-phase sinusoidal power input having a predetermined frequency and amplitude.

3. An apparatus according to claim 1, wherein said apparatus further comprises:
   (g) a low pass filter circuit coupled between said rectifier circuit and said inverter circuit.

4. An apparatus according to claim 1, wherein, during said pulse width modulation mode of operation, durations for said positive and negative pulses are determined by examination of an amplitude value of said at least one particular undesired transient condition.

5. An apparatus according to claim 1, wherein said controller is operable in the following additional mode of operation:

a transient detection mode of operation for detecting at least one particular undesired transient condition, and switching between said fixed pulse mode of operation and said pulse width modulation mode of operation in order to counteract the impact that said at least one particular undesired transient condition has upon said multiphase output.

6. An apparatus according to claim 5, wherein during said transient detection mode of operation, said controller executes program instructions for switching from a fixed pulse mode of operation to a pulse width modulation mode of operation upon detection of at least one particular undesired transient condition.

7. An apparatus according to claim 5, wherein during said transient detection mode of operation, said controller executes program instructions for switching from a pulse width modulation mode of operation to a fixed pulse mode of operation upon detection of abatement of said at least one particular undesired transient condition.

8. An apparatus according to claim 5, wherein said rectifier circuit develops a DC bus voltage which is supplied to said inverter circuit.

9. An apparatus according to claim 8, wherein, during said pulse width modulation mode of operation, durations for said positive and negative pulses are determined by comparison of said DC bus voltage to an amplitude value of said at least one particular undesired transient condition.

10. An apparatus according to claim 8, wherein, during said transient detection mode of operation, said controller executes program instructions which monitor said DC bus voltage for detection of said at least one particular undesired transient condition.

11. An apparatus according to claim 10, wherein, during said transient detection mode of operation, said controller executes program instructions which monitor for a positive voltage transient on said DC bus voltage.

12. A variable speed controller for supplying power to electrical power consuming subsurface wellbore equipment, comprising:

(a) an input for receiving a multiphase sinusoidal power input having a predetermined frequency and a predetermined amplitude;

(b) a power processing circuit for rectifying said multiphase sinusoidal power input and for producing a multiphase power output having a selected frequency from a range of available frequencies;

(c) a processor electrically coupled to said power processing circuit for executing program instructions in order to moderate operation of said power processing circuit in order to develop said multiphase power output having said selected frequency;

(d) wherein said controller is operable in a plurality of modes of operation, including:

(1) a fixed pulse mode of operation in which said controller executes program instructions for generating said multiphase sinusoidal output power having said selected frequency, by combining positive pulses and negative pulses in a predetermined manner;

(2) a pulse width modulation mode of operation in which said controller executes program instructions for generating said multiphase sinusoidal output power having said selected frequency by generating positive and negative pulses and combining the positive and negative pulses in a predetermined manner, wherein the duration of said positive pulses and said negative pulses is determined at least in part by a scaling factor applied to said positive pulses and negative pulses in a predetermined manner;

(3) wherein, during said fixed pulse mode of operation, said controller monitors said power processing circuitry in order to detect a transient condition; and (4) wherein, upon detection of said transient condition, said controller switches between said fixed pulse mode of operation and said pulse width modulation mode of operation, in order to dynamically correct the operation of the power processing circuit in a manner which counteracts the effect of the detected transient condition.

13. An apparatus according to claim 12, wherein, during said pulse width modulation mode of operation, said controller determines the duration of each of said positive pulses and negative pulses in a manner which dynamically adjusts the duration of at least one of the positive pulses and negative pulses in a predetermined manner through application of said scaling factor in order to immediately counteract the effects of the detected transient condition.

14. An apparatus according to claim 13, wherein, during said pulse width modulation mode of operation, said scaling factor is calculated at least in part based upon said amplitude of said detected transient condition.

15. An apparatus according to claim 14, wherein said scaling factor is determined from the ratio of the amplitude of said detected transient condition and at least one DC level of said power processing circuit.

16. An apparatus according to claim 15 wherein said scaling factor is the ratio of an optimum DC level within said power processing circuit and the actual value of the DC level as affected by said transient condition.

17. A method of supplying power to electrical power consuming subsurface wellbore equipment, comprising the method steps of:

(a) providing a multiphase sinusoidal power input having a predetermined frequency and amplitude;

(b) rectifying said multiphase sinusoidal power input;

(c) providing an inverter circuit for receiving said rectified sinusoidal power input as an input and for producing as an output a multiphase sinusoidal power output having a frequency which may be a selected frequency from a range of available frequencies;

(d) providing a processor for controlling said inverter circuit;

(e) utilizing said processor to execute program instructions in order to selectively switch between a plurality of modes of control, including at the least the following modes of control:

(1) a fixed pulse mode of operation in which said processor execute program instructions for generating a multiphase sinusoidal output having said selected frequency by combining positive pulses and negative pulses of fixed and uniform durations in a predetermined manner; and (2) a pulse width modulation mode of operation in which said controller executes program instructions for generating a multiphase sinusoidal output having said selected frequency by combining positive pulses and negative pulses in a predetermined manner, wherein said positive pulses and negative pulses have a duration which is dynamically determined in response to the detection by said processor of said at least one said preselected transient condition; wherein, said durations of said positive pulses and negative pulses is determined in a manner which counteracts the effect of said particular transient condition upon said output power.

18. A method according to claim 16, further comprising:
(f) utilizing said processor to switch between said fixed pulse mode of operation and said pulse width modulation mode of operation upon detection of said predetermined transient condition, and for switching back to said fixed pulse width mode of operation upon detection of abatement of said predetermined transient condition.

\* \* \* \* \*